(12) United States Patent
Mueller et al.

(10) Patent No.: US 6,545,104 B1
(45) Date of Patent: Apr. 8, 2003

(54) POLYORGANOSILOXANE RTV COMPOSITIONS

(75) Inventors: Dieter Mueller, Neuffen (DE); Dieter Koerner, Oberboihingen (DE)

(73) Assignee: Dow Corning GmbH, Wiesbaden (DE)

( * ) Notice: Subject to any disclaimer, the term of this patent is extended or adjusted under 35 U.S.C. 154(b) by 0 days.

(21) Appl. No.: 09/890,993

(22) PCT Filed: Feb. 3, 2000

(86) PCT No.: PCT/EP00/00882

§ 371 (c)(1),
(2), (4) Date: Oct. 9, 2001

(87) PCT Pub. No.: WO00/47680

PCT Pub. Date: Aug. 17, 2000

(30) Foreign Application Priority Data

Feb. 10, 1999 (GB) ............................................ 9902856

(51) Int. Cl.⁷ ............................................ C08G 77/458
(52) U.S. Cl. .................. 525/474; 528/901; 528/34; 528/28; 528/29; 525/452; 556/458; 556/463; 556/482; 524/588
(58) Field of Search ........................... 528/901, 34, 28, 528/29; 525/474, 452; 556/458, 463, 482; 524/588

(56) References Cited

U.S. PATENT DOCUMENTS

| 4,261,758 A | 4/1981 | Wright et al. ............ 106/287.12 |
| 4,336,358 A | 6/1982 | Alberts et al. ............... 525/439 |
| 4,798,878 A | 1/1989 | Brinkmann et al. ........... 528/28 |
| 5,264,515 A | * 11/1993 | Cody et al. |
| 5,425,947 A | 6/1995 | Hautekeer et al. ........... 524/267 |

FOREIGN PATENT DOCUMENTS

| DE | 25 43 966 A1 | 2/1975 |
| DE | 32 21 655 A1 | 6/1982 |
| EP | 0 543 615 A1 | 11/1992 |

OTHER PUBLICATIONS

Abstract of JP 55–133453.*

"The Synthesis and Morphology of Semi–Interpenetrating Polymer Networks Based on Polyurethane–Polydimethylsiloxane System"; 907 *Journal of Polymer Science Part A: Polymer Chemistry Edition,*, vol. 28 (*1990*) Feb., No. 3, New York, US, pp. 585–594.

* cited by examiner

*Primary Examiner*—Margaret G. Moore
*Assistant Examiner*—Kuo-Liang Peng
(74) *Attorney, Agent, or Firm*—Duane Morris LLP

(57) ABSTRACT

The specification describes and claims room temperature vulcanisable compositions formed by mixing components comprising a polysiloxane having hydroxyl or hydrolysable groups, a crosslinker having silicon bonded hydrolysable groups selected from the group consisting of alkoxy-, acetoxy- and oximo and a hydroxy terminated urethane prepolymer with no residual isocyanate groups formed from a polyol and an isocyanate. The compositions demonstrate improved adhesion, thixotropy and toolability.

8 Claims, No Drawings

POLYORGANOSILOXANE RTV COMPOSITIONS

This invention is concerned with organosiloxane compositions which are curable to elastomers and also relates to the use of such compositions as sealing materials.

Organosiloxane compositions which cure to elastomeric solids are well known. Typically such compositions are obtained by mixing a polydiorganosiloxane having reactive terminal groups, generally silanol groups, with a silane cross-linking agent for the polydiorganosiloxane, for example an alkoxy silane, an acetoxy silane or oximo silane, a filler and a curing catalyst. These compositions are frequently single part compositions curable upon exposure to atmospheric moisture at room temperature or two part compositions curable upon mixing under room conditions.

One important application of the above-described curable compositions is their use as sealants. In use as a sealant, it is important that the composition has a blend of properties which render it capable of application as a fluid to a joint between substrate surfaces where it can be worked, prior to curing, to provide a smooth surfaced mass which will remain in its allotted position until it has become cured to an elastomeric body adherent to the adjacent substrate surfaces. It is frequently desirable that the composition cures quickly enough to provide a sound seal within several hours but not so quickly that the surface cannot be tooled to desired configuration shortly after application. Among specifically desirable attributes for such compositions are thixotropy to the extent desirable for the composition to remain in its allotted location whilst curing in the joint whether horizontal or upright together with flowability to the extent desirable to enable tooling of the surface by use of a wetted spatula without sticking to the spatula and without beading. Satisfactory adhesion to as many of a variety of materials as possible, especially those used in construction or automotive applications is also required for example glass, polyacrylates, polycarbonates, steel, aluminium, wood and concrete. Furthermore, a relatively fast cure is desirable, including a fast surface cure rate to provide a mass with good elasticity of the skin formed and lack of surface tackiness after curing for about 24 hours. The cured composition should have a strength and elasticity appropriate for the particular joint concerned.

Conventional silicone sealant compositions typically contain a reinforcing filler and possibly an extending filler. The fine particle size silicas and calcium carbonates such as fumed silicas and precipitated calcium carbonates are often used to provide the reinforcing filler and various materials are employed as extending fillers. Generally speaking, those compositions which are required to demonstrate thixotropic properties prior to cure and higher tensile and tear strength properties when cured employ larger quantities of the reinforcing fillers. The silicas are generally employed in those compositions which are intended to be transparent or at least substantially so whereas the calcium carbonates are often employed in compositions where transparency is less required.

It is also a common practice in the formulation of silicone based sealants to incorporate a material which serves as a plasticiser or extender for the composition. Commonly the trimethylsilyl polydiorganosiloxanes are used for this purpose. Whilst they are effective at the time of application of the sealant and subsequently, at least for a time, sometimes they exude from the sealant over time and may give rise to staining of the surrounding substrates onto which the material bleeds.

It is one of the various objects of this invention to provide a curable organosiloxane composition having an improved blend of properties.

Surprisingly we have now found that curable organosiloxane compositions which contain certain polyhydroxyl urethane prepolymer materials may be formulated which have a lower cost or improved combinations of properties.

The present invention provides in one of its aspects a room temperature vulcanisable composition formed by mixing components comprising a polysiloxane having hydroxyl or hydrolysable groups, a crosslinker having silicon bonded hydrolysable groups selected from the group consisting of alkoxy-, acetoxy- and oximo- silanes, and a hydroxyl terminated urethane prepolymer.

The concept of "comprising" where used herein is used in its widest sense to mean and to encompass the notions of "include" and "consist of".

In a composition according to the invention, the hydroxyl bearing polysiloxane may be according to the general formula X-A-X where A may be any desired siloxane molecular chain for example a polydiorgano-siloxane chain and thus preferably includes siloxane units $R_sSiO_{(4-s)}$ in which R represents an alkyl group having from 1 to 10 carbon atoms (for example, a methyl, ethyl, propyl, butyl, vinyl, cyclohexyl, phenyl or tolyl group) or a halogenated hydrocarbon group having 1 to 10 carbon atoms (for example a chloropropyl or fluorinated alkyl group for example 3,3,3-trifluoropropyl, chlorophenyl, beta-(perfluorobutyl)ethyl or chlorocyclohexyl group) and s has a value of 0, 1 or 2. The organic groups are preferably at least substantially all methyl groups. Preferred materials are linear materials i.e. s=2 for all chain units. Preferred materials have polydiorgano-siloxane chains according to the general formula —$(R'_2SiO)_t$— in which each R' represents a methyl group and t has a value from about 200 to about 1500. Suitable materials have viscosities of the order of about 100 mPa.s to about 300,000 mPa.s. The groups X of the polymeric material are hydroxyl or hydrolysable groups and may be selected, for example, from —$R_2SiOH$, —$RSi(OR^2)_2$, —$Si(OR^2)_3$, —$R_2SiOR^2$ or —$R_2SiR''SiR_p(OR^2)_{3-p}$ where R represents an alkyl group having from 1 to 6 carbon atoms as aforesaid, (and is preferably methyl), R'' is a divalent hydrocarbon group which may be interrupted by one or more siloxane spacers having up to six silicon atoms, $R^2$ is an alkyl or oxyalkyl group in which the alkyl groups have up to 6 carbon atoms and p has the value 0, 1 or 2. Preferred polysiloxanes are thus polydiorganosiloxanes having terminal, silicon-bound hydroxyl groups or terminal, silicon-bound organic radicals which can be hydrolysed using moisture. These polydiorganosiloxanes preferably have a viscosity of 0.5 to 200 Pa.s at 25° C. The polydiorganosiloxanes may be homopolymers or copolymers. Mixtures of different polydiorganosiloxanes having terminal condensable groups are also suitable.

In a composition according to the invention the crosslinker is a silicon compound containing hydrolysable groups and preferably comprises one or more silanes. The hydrolysable groups are suitably silicon-bonded hydrolysable groups exemplified by acyloxy groups (for example acetoxy, octanoyloxy, and benzoyloxy); ketoximo groups (for example dimethyl ketoximo, methylethyl ketoximo, diethyl ketoximo, amylmethyl ketoximo, and isobutylmethyl ketoximo); alkoxy groups (for example methoxy, ethoxy, and propoxy) and alkenyloxy groups (for example isopropenyloxy and 1-ethyl-2-methylvinyloxy). The crosslinker can have three or more silicon-bonded hydrolysable groups per molecule. When the crosslinker is a silane and when the silane has three silicon-bonded hydrolysable groups per molecule, the fourth group is suitably a non-hydrolysable silicon-bonded organic group. These silicon-bonded organic groups are exemplified by alkyl groups (for example methyl, ethyl, propyl, and butyl); cyclo alkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The silicon-bonded organic groups are preferably methyl. The crosslinker can be a silane or siloxane and in the case of siloxanes the molecular structure can be straight chained, branched, or cyclic and the silicon-bonded hydrolysable groups are exemplified by acyloxy groups; alkoxy groups and oximo groups as aforesaid. The silanes and siloxanes are exemplified by methyltrimethoxysilane, methyltriethoxysilane, vinyltrimethoxysilane, vinyltriethoxysilane, methylphenyl-dimethoxysilane, 3,3,3-trifluoropropyltrimethoxy-silane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-(methylethylketoximo)silane, 3,3,3-trifluoropropyltris(methylethylketoximo)silane, methyltris(isopropenoxy) silane, vinyltris(isopropenoxy) silane, ethylpolysilicate, n-propylorthosilicate, dimethyltetraacetoxydisiloxane, and mixtures thereof.

The condensation catalyst chosen for inclusion in a particular silicone sealant composition depends upon the speed of cure required. Most of the silicone sealant compositions which contain oximosilanes or acetoxysilanes use a tin catalyst for curing, especially diorganotin dicarboxylate compounds such as dibutyltin dilaurate, dibutyltin diacetate, dimethyltin bisneodecanoate, and the like whereas for the alkoxysilane crosslinker containing silicone sealant compositions the most preferred curing catalysts are titanium compounds such as tetrabutyltitanate, tetraisopropyltitanate, diisopropyl bis(acetylacetonyl) titanate, diisopropyl bis(ethylacectoacectonyl) titanate, and the like.

A composition according to the present invention comprises a hydroxyl terminated urethane prepolymer. The prepolymer may be formed by chemical reaction between selected isocyanate and selected polyol. The isocyanate employed in the preparation of the urethane prepolymer is preferably a polyisocyanate and is preferably one or more of those referred to as aliphatic isocyanates. The polyisocyanate may be selected for example from the group consisting of hexamethylene diisocyanate $O=C=N(CH_2)_6N=C=O$ (HDI), the dimer of HDI, the biuret of HDI $O=C=N(CH_2)_6N(CONH(CH_2)_6NCO)_2$ or the trimer (isocyanurate) of HDI,

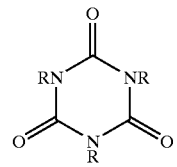

where each R represents —$(CH_2)_6N=C=O$,

| | | |
|---|---|---|
| isophorone diisocyanate (IPDI) | [4098-71-9] | 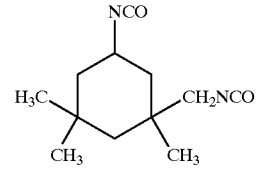 |
| 4,4'-dicyclohexy)methane diisocyanate (H$_{12}$MDI)[a] | [5124-30-1] | 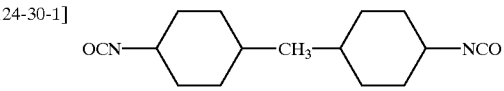 |
| 1,4-cyclohexane diisocyanate (CHDI)[a] | [2556-36-7] | 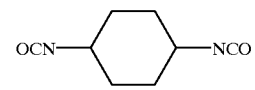 |
| bis(isocyanatomethyl)cyclohexane (H$_S$XDI,DDI)[a] | [38661-72-2] | 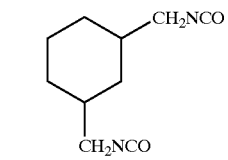 |
| tetramethylxylylene diisocyanate (TMXDI) | [2778-42-9] | 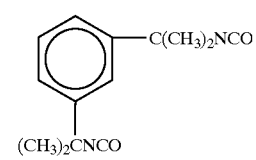 |

[a]Mixture of stereoisomers.

and mixtures thereof.

Each of these isocyanates has two or more isocyanate groups available for reaction, the biuret and trimer of HDI each having three isocyanate groups available for reaction. HDI, HDI dimer and HDI trimer have alkylene chains supporting the isocyanate groups whereas HDI dimer, HDI trimer and IPDI, for example, have a saturated ring structure supporting the isocyanate groups. These saturated linear and ring structures are desirable in preference to the unsaturated aromatic ring structures of so called aromatic isocyanates because they do not appear to lead to yellowing of the final silicone product to the same extent as can occur when the aromatic isocyanates are used to prepare the prepolymer. Of the aliphatic isocyanates, the most preferred is hexamethylene diisocyanate trimer HDI, which offers low toxicity effects and good reactivity with polyols.

The polyol employed in the preparation of the urethane prepolymer is preferably a diol or triol. Preferably the polyol is selected from the group consisting of polymers and copolymers of ethylene glycol and polypropylene glycol, polytetramethylene glycol, poly(butanediol adipate), polycaprolactone, polycaprolactam based polyol, ethoxylated trimethyl propane polyol, tetrahydrofuran and polyester polyols. Preferably the polyol has an hydroxyl number from 10 to 1000 so as to ensure that the resulting prepolymers have the necessary physical and chemical properties to enable the prepolymer to perform its desired additive functions. The hydroxyl number of a substance is the number of mg of KOH equivalent to the hydroxyl content of 1.0 g of the substance and gives a measure of the reactive hydroxyl groups available per molecule of polyol.

The polyol and polyisocyanate are reacted together in proportions to ensure that the prepolymer exhibits no residual isocyanate groups. Preferred urethane prepolymers are branched materials; the degree of branching influences the contribution the prepolymer can make and may be controlled by appropriate selection of the functionality and geometry of the polyol and polyisocyanate employed in the preparation of the prepolymer. The prepolymers may be produced by mixing the selected polyol and isocyanate together and reaction is generally completed at room temperature within a few minutes to a few hours in presence of a suitable catalyst. Suitable catalysts include those which are typically used in polyurethane manufacture and also in condensation reaction systems using silicones for example dibutyl tin diacetate, dibutyl tin dilaurate. If desired the reaction mixture may be heated to accelerate the reaction.

A composition according to the invention may be formulated to demonstrate characteristic properties and the specific prepolymer employed and the proportion of it that is employed may be selected with a view to achieving a desired blend of properties. These prepolymers influence favourably various properties, including toolability properties (which enable the composition to be readily tooled with a wet spatula without formation of supplementary beads, or sticking to the spatula), "thixotropy" (required for non-sag and non-flow of the composition when in its allotted position prior to curing), adhesion of the cured composition to a variety of substrates employed in the construction industry, non-staining of surrounding materials upon prolonged exposure of the cured composition to weather, cracking of the sealant during curing, formation of bubbles in the mass during curing, and formation of longitudinal "semi-detachments" of the sealant surface from the substrate during curing. One may employ the prepolymer in amounts to provide from about 0.1 to about 25% by weight of the final mixed composition, i.e. about 0.1 to about 30 parts by weight prepolymer per hundred parts by weight of the rest of the composition. The appropriate proportion of prepolymer depends on the materials employed to make the prepolymer and also on the geometry of the prepolymer molecule; both the more linear and the more complex structured prepolymers favourably influence non-staining properties; also, the more linear materials can be used in very small proportions and yet influence the plasticity, flow and adhesion properties significantly, whereas the more branched or complex structures can be used to good effect in small amounts to influence the thixotropy properties. Indeed these prepolymers influence the thixotropy of the composition significantly in proportions from 0.5 to 10 parts per 100 parts by weight of the rest of the composition, to the extent that they may be used to meet some at least of the requirement for presence of "reinforcing" filler such as fumed silica in the composition. This is an important economic factor for those who wish to modify sealant compositions obtained from others without purchasing fumed silica which is comparatively expensive for them. Preferred prepolymers are formed from HDI trimer and poly(oxyethylene-oxypropylene) glycol of hydroxyl number 35 and molecular weight 4,800.

Compositions of this invention may contain as optional constituents other ingredients which are conventional to the formulation of silicone rubber sealants and the like. For example, the compositions will normally contain one or more finely divided, reinforcing or extending fillers such as high surface area fumed and precipitated silicas, crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per loo parts by weight of the polymeric material.

Other ingredients which may be included in the compositions are co-catalysts for accelerating the cure of the composition, pigments, plasticisers, agents (usually organosilicon compounds) for treating fillers, rheological additives for improving toolability of the composition and adhesion improving substances for example γ-aminopropyl triethoxysilane. Suitable co-catalysts are well known in the art and include the metal salts of carboxylic acids and amines. Another conventional ingredient which can be employed as a plasticiser and to reduce the modulus of the cured elastomer is a polydimethyl siloxane having terminal triorganosiloxy groups wherein the organic substituents are e.g. methyl, vinyl or phenyl or combinations of these groups. Such polydimethylsiloxanes normally have a viscosity of from about 10 to about 1,000 mPa.s at 25° C. and can be employed in amounts up to about 80 parts per 100 parts by weight of the polymeric material.

The compositions of this invention can be prepared by mixing the ingredients employing any suitable mixing equipment. For example preferred one part, moisture curable compositions may be made by mixing together the polysiloxane having hydroxyl or hydrolysable groups, the organosilicon plasticiser (when present), the cross linker and catalyst, followed by dispersion of the prepolymer and fillers in this mixture. Pigments and minor additives may be added to the mixture at any desired stage, and this is preferably done as near the end of the mixing procedure as possible. If desired, the prepolymer may be added and mixed into the composition after mixing of all the other ingredients. After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break which is sufficiently high for most industry standards. By appropriate use of the prepolymers one may formulate compositions in which the proportions of for example silica and trimethylsilyl polydiorganosiloxane are significantly reduced as compared with conventional practice with silicone sealants, thus leading in the one case to a choice of thixotropy properties from addition of the prepolymer to supplement or replace silica which would otherwise be used and in the other to use the prepolymer to supplement or replace the polydimethylsiloxane plasticiser which would otherwise be used, with consequent reduction of bleeding of the plasticiser from the cured sealant.

The invention provides in another of its aspects a method of improving the adhesion, thixotropy, toolability, voiding or cracking properties of a room temperature vulcanisable silicone sealant composition which comprises incorporating a hydroxy terminated urethane prepolymer with no residual isocyanate groups into a mixture or reaction product of an alpha omega hydroxypolysiloxane, a crosslinker silane selected from the group consisting of alkoxy-, acetoxy- and oximo-silanes, a filler and a condensation catalyst.

The invention also provides in another of its aspects the use in a room temperature vulcanisable silicone sealant composition of a hydroxy terminated urethane prepolymer with no residual isocyanate groups as an adhesion promoter, a thixotropy enhancer, a toolability enhancer, or an additive to reduce voiding or cracking.

In order that the invention may become more clear there now follows a detailed description of Examples selected for description to illustrate the invention by way of example. In the Examples, all parts are by weight and all viscosities are at 25° C. unless the context otherwise requires.

EXAMPLE 1

Example prepolymers were formed from the isocyanate and polyol materials recited in Table 1 in the proportions shown. Each prepolymer was formed by mixing the polyol and a catalyst (dibutyl tin dilaurate) and then, at room temperature, slowly adding the isocyanate and continuing to mix the components. After two hours the reaction had evidently been completed and infra red analysis of the resulting prepolymers showed no unreacted isocyanate group present in the prepolymer.

In the examples, Polyol 1 was Arcol 1074 supplied by Arco which is a polypropylene glycol polyethylene glycol copolymer triol; Polyol 2 was Arcol 1042 supplied by Arco which is a polypropylene glycol polyethylene glycol copolymer triol; Polyol 3 was Arcol 1034 supplied by Arco which is a polypropylene glycol polyethylene glycol copolymer triol; Polyol 4 was Voranol CP 4055 supplied by Dow Chemical which is a polyether triol; Polyol 5 was Acclaim Polyol 12200 supplied by Arco which is a polyether diol; Polyol 6 was Acclaim -Polyol 6300 LA supplied by Arco which is a polyether triol; Polyol 7 was Polyol TP08 supplied by Perstop which is an ethoxylated trimethylolpropane triol; Polyol 8 was Hopol F330 supplied by Hooker which is a polyester triol; Polyol 9 was Tone Polyol 0310 supplied by Union Carbide which is a caprolactone triol; Polyol 10 was Tone Polyol 0301 supplied by Union Carbide which is a caprolactone triol and Polyol 11 was Terathane 2000 supplied by Du Pont which is a polytetrahydrofuran diol.

Isocyanate 1 was hexamethylene diisocyanate trimer; Isocyanate 2 was hexamethylene diisocyanate biuret and Isocyanate 3 was isophorone diisocyanate.

TABLE 1

| Example Prepolymer | Polyol Type | # | Hydroxyl Value | Molecular weight | Parts by Weight | Isocyanate # | Parts by Weight |
|---|---|---|---|---|---|---|---|
| | Polyetherpolyol | | | | | | |
| 1 | Arcol 1074 | 1 | 27 | 6200 | 200 | 1 | 4 |
| 2 | Arcol 1042 | 2 | 35 | 4800 | 200 | 1 | 6 |
| 3 | Arcol 1034 | 3 | 48 | 3500 | 200 | 1 | 8 |
| 4 | Voranol CP 4055 | 4 | 40 | 4000 | 200 | 1 | 6 |
| 5 | Acclaim Polyol 12200 | 5 | 10 | 12200 | 200 | 1 | 2 |
| 6 | Acclaim Polyol 6300 LA Ethoxylated trimethylolpropane | 6 | 28 | 6000 | 200 | 1 | 4 |
| 7 | Polyol TP08 Polyester Polyol | 7 | 990 | 170 | 200 | 1 | 45 |
| 8 | Hopol F330 Polycaprolactone | 8 | 40 | | 200 | 1 | 4 |
| 9 | Tone Polyol 0310 | 9 | 187 | 900 | 200 | 1 | 25 |
| 10 | Tone Polyol 301 Polytetrahydrofuran polyol | 10 | 560 | 300 | 200 | 1 | 60 |
| 11 | Terathane2000 Polyetherpolyol | 11 | 55 | 2000 | 200 | 1 | 10 |
| 12 | Arcol 1042 | 12 | 35 | 4800 | 200 | 2 | 6 |
| 13 | Arcol 1042 | 13 | 35 | 4800 | 200 | 3 | 4 |

EXAMPLE 2

Masterbatch sealant compositions were prepared as follows.

Masterbatch Sealant Composition 1, an acetoxy curing composition was prepared by mixing at room temperature in absence of moisture 60 parts of hydroxyl terminated polydimethyl siloxane of viscosity 80,000 mPa.s, 2 parts of methyl triacetoxysilane, 2 parts ethyl triacetoxysilane, 0.8 parts of di tert butoxy diacetoxysilane, 9 parts of fumed silica, 27 parts of trimethylsilyl end-blocked polydimethylsiloxane fluid of viscosity 100 mPa.s and 0.1 parts of dibutyl tin diacetate as condensation catalyst.

Masterbatch Sealant Composition 2, an oximo curing composition was prepared by mixing at room temperature in absence of moisture 56 parts of hydroxyl terminated polydimethylsiloxane of viscosity 80,000 mPa.s, 5 parts of vinyl and methyl tri (methyl ethyl ketoximo)silane, 11 parts of fumed silica, 26 parts of trimethylsilyl end-blocked polydimethylsiloxane fluid of viscosity 100 mPa.s, 2 parts of N-aminoethyl-3-aminopropyl-trimethoxysilane as adhesion promoter and 0.03 parts of dibutyl tin dilaurate as condensation catalyst.

Masterbatch Sealant Composition 3, an alkoxy curing composition was prepared by mixing at room temperature in absence of moisture 65 parts of ethylene trialkoxysilyl terminated poldimethylsiloxane of viscosity 110,000 mPa.s, 4 parts of methyl trimethoxysilane, 10 parts of fumed silica, 18 parts of trimethylsilyl end-blocked polydimethylsiloxane fluid of viscosity 100 mPa.s, 2 parts of titanium ester condensation catalyst and 1 part of an adhesion promoter, being a mixture of γ-ethylenediaminopropyl trimethoxysilane and γ-glycidoxypropyl trimethoxysilane.

Masterbatch Sealant Composition 4, an oximo curing composition was prepared by mixing at room temperature in absence of moisture 56 parts of hydroxyl terminated polydimethylsiloxane of viscosity 50,000 mPa.s, 5 parts of vinyl and methyl tri (methyl ethyl ketoximo)silane, 9 parts of fumed silica, 2 parts of N-aminoethyl-3-aminopropyl-trimethoxysilane as adhesion promoter and 0.03 parts of dibutyl tin dilaurate as condensation catalyst. This composition contains no trimethylsilyl end-blocked polydimethylsiloxane fluid of viscosity loo mPa.s as is used in Masterbatch Sealant Composition 2.

Several sealant compositions were made up by mixing the example prepolymers with the Masterbatch Sealant Compositions in the proportions shown in Table 2. Various properties of these compositions were evaluated and the results are also shown in Tables 2 and 3.

Penetration values were determined using freshly extruded composition using a penetrometer PNR supplied by Petrotest Instruments GmbH & Co KG. 30 ml of the composition was charged to a beaker, free of bubbles and used at normal room conditions. The skinning surface of the sealant was moved away with a spatula. The penetrometer needle was driven into the composition so that the needle tip buries into the sealant. The distance that the needle penetrates into the sealant during a period of 5 seconds was measured and the average of three determinations was recorded in Table 2. These penetration values indicate thixotropy of the composition as it begins to cure and reflect flow and tooling properties of the uncured composition.

UV adhesion resistance was evaluated using samples prepared by applying a layer of the composition onto a glass plate. The assembly was aged for one week under room temperature conditions to effect curing and then, the composition was submitted to exposure, through its glass plate, to a UV lamp for three weeks. An extremity of the layer was cut from the plate and pulled at 90° away from the plate so as to make a visual evaluation of the continued adhesion of the composition to its glass and the continued cohesion of the cured composition.

The samples used for the UV adhesion resistance evaluation were also inspected for cracking and voids. UV resistance was evaluated by visual inspection for discolouration or surface deterioration.

Cracking was evaluated by applying a round layer of sealant with a thickness of 2 mm and a diameter of 40 mm between two glass plates. These samples were allowed to cure by exposure to atmosphere for 7 days under room conditions. The samples were aged for a further week and then visually evaluated for cracks and voids.

TABLE 2

| Composition | Masterbatch Sealant | Prepolymer Number | Prepolymer Amount per 100 parts Masterbatch | Penetration | Adhesion after UV exposure AF = adhesion failure CF = cohesive failure | UV Resistance | Cracking +=less −=more cracking |
|---|---|---|---|---|---|---|---|
| MS 1 | MS 1 | Nil |  | 14.80 | AF | ok | − |
| 1 | MS 1 | 1 | 2 | 7.60 | CF | ok | + |
| 2 | MS 1 | 1 | 5 | 7.23 | CF | ok | + |
| 3 | MS 1 | 1 | 10 | 10.63 | CF | ok | + |
| 4 | MS 1 | 2 | 2 | 7.73 | CF | ok | + |
| 5 | MS 1 | 2 | 5 | 8.38 | CF | ok | + |
| 6 | MS 1 | 2 | 10 | 9.54 | CF | ok | + |
| 7 | MS 1 | 5 | 2 | 9.21 | CF | ok | + |
| 8 | MS 1 | 5 | 5 | 11.23 | CF | ok | + |
| 9 | MS 1 | 5 | 10 | 17.63 | CF | ok | + |
| 10 | MS 1 | 12 | 2 | 7.82 | CF | ok | + |
| 11 | MS 1 | 12 | 5 | 8.2 | CF | ok | + |
| 12 | MS 1 | 12 | 10 | 10.62 | CF | ok | + |
| 13 | MS 1 | 13 | 2 | 8.78 | CF | ok | + |
| 14 | MS 1 | 13 | 5 | 10.65 | CF | ok | + |
| 15 | MS 1 | 13 | 10 | 13.42 | CF | ok | + |

TABLE 3

| Composition | Masterbatch Sealant | Prepolymer Number | Prepolymer Amount per 100 parts Masterbatch | Penetration | Adhesion after UV exposure AF = adhesion failure CF = cohesive failure | UV Resistance |
|---|---|---|---|---|---|---|
| MS 2 | MS 2 | Nil | | 16.40 | CF | ok |
| 101 | MS 2 | 1 | 2 | 11.15 | CF | ok |
| 102 | MS 2 | 1 | 5 | 10.25 | CF | ok |
| 103 | MS 2 | 1 | 10 | 9.20 | CF | ok |
| 104 | MS 2 | 2 | 2 | 9.85 | CF | ok |
| 105 | MS 2 | 2 | 5 | 7.75 | CF | ok |
| 106 | MS 2 | 2 | 10 | 6.50 | CF | ok |
| 107 | MS 2 | 5 | 2 | 14.60 | CF | ok |
| 108 | MS 2 | 5 | 5 | 13.70 | CF | ok |
| 109 | MS 2 | 5 | 10 | 13.50 | CF | ok |

TABLE 4

| Composition | Masterbatch Sealant | Prepolymer Number | Prepolymer Amount per 100 parts Masterbatch | Penetration | Adhesion after UV exposure |
|---|---|---|---|---|---|
| MS 3 | MS 3 | Nil | | 14.50 | AF |
| 201 | MS 3 | 1 | 2 | 11.20 | CF |
| 202 | MS 3 | 1 | 5 | 9.79 | n.a. |
| 203 | MS 3 | 1 | 10 | 9.05 | n.a. |
| 204 | MS 3 | 2 | 2 | 14.20 | CF |
| 205 | MS 3 | 2 | 5 | 14.00 | n.a. |
| 206 | MS 3 | 2 | 10 | 10.20 | n.a. |
| 207 | MS 3 | 5 | 2 | 14.20 | n.a. |
| 208 | MS 3 | 5 | 5 | 13.10 | n.a. |
| 209 | MS 3 | 5 | 10 | 14.00 | n.a. |

EXAMPLE 3

A sealant composition was made up by mixing Prepolymer 5 with Masterbatch Sealant Composition 4 according to Table 5. A test for bleeding and staining was carried out as follows:

A cured rubber slab was made from the mixture of Masterbatch Sealant Composition 4 with prepolymer number 5 that measured 50 mm long, 30 mm wide and 3 mm thick. This slab was assembled between 2 sheet metal blades each 5 mm thick and measuring 100 mm by 100 mm together with five layers of filter paper that were stacked on one side of the cured rubber slab. The type of filter paper was 589 Weissband filter paper Ref. No. 300 111 from Schleicher & Schuell. This assembly of metal blades, silicone rubber and filter paper was pressed together with metal screw clamps to the extend that the thickness of the silicone slab was reduced by 5. The assembly was aged for two weeks at 50° C. and then a line was drawn with a fountain pen across each sheet of filter paper and the extent to which the ink spread into the surrounding filter paper was observed. It is believed that the ink would spread rapidly sideways from the line if the filter paper was not exposed to polydimethyl siloxane that may have bled from the cured rubber into the filter paper whereas if a sheet of filter paper was exposed to polydimethyl siloxane before application of the ink line, the line would not spread sideways. The higher the level of bleeding, the more layers of filter paper would be impregnated by the bleeding polymers. It was found that with the Masterbatch Sealant Composition 4 with prepolymer number 5 showed there no visible bleeding effect after the first filter layer closest to the cured rubber slab. In contrast sealant that was made with Masterbatch Sealant Compositions 1, 2 or 3 showed a bleeding effect in all five layers of the filter paper.

Masterbatch Sealant 4 containing no pre polymer demonstrated no staining or bleeding, a modulus of 0.58 and an elongation at break of 276%. The same composition containing 10 phr of pre polymer 5 also demonstrated no staining or bleeding but had a reduced modulus of 0.47 and an increased elongation at break of 390%; compositions having a modulus in this region find use as sealants for certain applications. In contrast, Masterbatch Sealant composition 2 containing plasticiser but no pre polymer showed significant staining and bleeding, a modulus of 0.39 and an elongation at break of 485%. Thus it can be seen that use of a pre polymer in Masterbatch Sealant composition enables provision of plasticised compositions without accompanying staining.

TABLE 5

| Composition | Masterbatch Sealant | Prepolymer Number | Prepolymer Amount per 100 parts Masterbatch | Staining | Modulus ACCORDING Din 53 504 | Elongation at break |
|---|---|---|---|---|---|---|
| -- | MS 4 | N.A | 0 | no staining and bleeding observed | 0.58 | 276% |

TABLE 5-continued

| Composition | Masterbatch Sealant | Prepolymer Number | Amount per 100 parts Masterbatch | Staining | Modulus ACCORDING Din 53 504 | Elongation at break |
|---|---|---|---|---|---|---|
| 301 | MS 4 | 5 | 10 | no staining and bleeding observed | 0.47 | 390% |
| MS 1 | MS 1 | Nil | — | significant staining and bleeding | | |
| MS 2 | MS 2 | Nil | — | significant staining and bleeding | 0.39 | 485% |
| MS 3 | MS 3 | Nil | — | significant staining and bleeding | | |

What is claimed is:

1. A room temperature vulcanisable composition formed by mixing components comprising
   a) a polysiloxane having hydroxyl or hydrolysable groups,
   b) a crosslinker having silicon bonded hydrolysable groups selected from the group consisting of alkoxy-, acetoxy- and oximo and
   c) a hydroxy terminated urethane prepolymer with no residual isocyanate groups formed from a polyol and an isocyanate.

2. A composition according to claim 1 wherein the polyol has an hydroxyl number from 10 to 1000.

3. A composition according to claim 1 wherein the polyol is a diol or triol.

4. A composition according to claim 1 wherein the polyol is selected from the group consisting of polymers and copolymers of ethylene glycol and polypropylene glycol, caprolactam based polyol, ethoxylated trimethyl propane polyol, tetrahydrofuran polyol and polyester polyol.

5. A composition according to claim 1 wherein the isocyanate is an aliphatic material.

6. A composition according to claim 1 wherein the isocyanate is selected from the group consisting of hexamethylene diisocyanate, hexamethylene diisocyanate dimer (biuret), hexamethylene diisocyanate trimer (isocyanurate), isophorone diisocyanate and tetra methyl xylylene diisocyanate.

7. A composition according to claim 1 also comprising up to 150 parts by weight filler per 100 parts by weight of the polysiloxane (a).

8. A method of improving the thixotropy, toolability, adhesion, cracking, voiding or bleed properties of a room temperature vulcanisable silicone sealant composition which comprises mixing
   a) an alpha omega hydroxypolysiloxane, a crosslinker silane selected from the group consisting of alkoxy-, acetoxy- and oximo-silanes, a condensation catalyst and
   b) a hydroxy terminated urethane prepolymer with no residual isocyanate groups.

* * * * *